United States Patent [19]

Reed

[11] 4,436,450
[45] Mar. 13, 1984

[54] APPARATUS AND METHOD FOR REMOVING BUOYANCY MODULES FROM SUBMERGED PIPE

[75] Inventor: Don C. Reed, Humble, Tex.

[73] Assignee: Exxon Production Research Co., Houston, Tex.

[21] Appl. No.: 294,968

[22] Filed: Aug. 21, 1981

[51] Int. Cl.³ .......................... F16L 1/04; B63B 21/52
[52] U.S. Cl. .................................... 405/171; 441/133
[58] Field of Search .............. 405/161, 164, 158, 171, 405/173, 172, 162, 166; 441/133; 114/221 A; 299/88, 106, 111; 43/43.12

[56] References Cited

U.S. PATENT DOCUMENTS

| | | |
|---|---|---|
| 2,770,950 | 11/1956 | Collins . |
| 3,594,835 | 7/1971 | Wilson ............................ 405/171 X |
| 3,722,706 | 3/1973 | Blonsky ......................... 294/106 X |
| 3,727,417 | 4/1973 | Shaw . |
| 3,841,106 | 10/1974 | Blumberg . |
| 3,844,129 | 10/1974 | Finlay . |
| 3,860,282 | 1/1975 | Johnson .......................... 294/106 X |
| 4,011,729 | 3/1977 | Kermel . |
| 4,067,199 | 1/1978 | Jegousse ............................. 405/171 |
| 4,107,802 | 8/1978 | Patinet et al. . |
| 4,127,007 | 11/1978 | Mathieu et al. . |
| 4,135,844 | 1/1979 | Lamy . |
| 4,191,494 | 3/1980 | Nakamura et al. ............. 405/162 X |
| 4,264,234 | 4/1981 | Pras . |
| 4,332,510 | 6/1982 | Ferrentino ......................... 405/171 |

*Primary Examiner*—Cornelius J. Husar
*Assistant Examiner*—Nancy J. Stodola
*Attorney, Agent, or Firm*—Richard F. Phillips

[57] ABSTRACT

Apparatus for releasably attaching a buoyant module to a submerged pipeline and for releasing the module therefrom is disclosed. The apparatus comprises a strap wrapped over the top of the module and around the underside of the pipeline and a link connected between the opposing ends of the strap. The link is breakable upon application thereto of a design tension greater than that exerted thereon by the positive buoyancy force of the module. The apparatus also comprises a sled slideably mounted on the upper surface of the pipeline, means for engaging the sled to a source of propulsion and a wedge attached to the leading end of the sled which has an inclined surface sloping downwardly from the top of the sled to the pipeline and pryably engageable with the module. The wedge, when propelled by a sufficient force against the module, pries the module from the pipeline by exerting an upward force thereon that exceeds the difference between the design tension and the positive buoyant force of the module to break the link and release the module.

A method for releasing a buoyant module releasably attached to a submerged pipeline by a breakable strap is also disclosed. The method comprises the steps of positioning a sled having a wedged end on the pipeline, actuating coupling arms pivotally attached to the sled to a closed position in which the arms slideably grip the pipeline, and propelling the wedged end of the sled along the pipeline against the module with sufficient force to pry the module substantially upwardly to break the strap and release the module.

11 Claims, 15 Drawing Figures

APPARATUS AND METHOD FOR REMOVING BUOYANCY MODULES FROM SUBMERGED PIPE

FIELD OF THE INVENTION

The present invention relates to buoyant modules attached to a pipeline submerged in an aquatic medium. More particularly, it relates to a method and apparatus for releasing a buoyant module from a submerged pipe.

BACKGROUND OF THE INVENTION

The development of offshore oil fields in deep waters has necessitated the laying of lengthy pipelines in order to transport oil and gas from remotely located fields to more centrally located production and storage facilities. In the past, this has been accomplished by towing sections of the pipeline to the location at which the pipeline is to be submerged. Buoyant modules are sometimes attached to the pipeline to reduce frictional stresses between the pipeline and the sea floor. More recently it has been suggested to provide a sufficient number of buoyant modules to make the pipeline positively buoyant and to attach to each module a chain that would partially drag on the sea floor to maintain the pipeline at a predetermined distance above the sea floor.

After the pipeline has been installed, the buoyant modules must be removed. If the modules have been submerged to a depth below which it is no longer cost-effective to use a diver, approximately 200 to 300 feet, remotely controlled apparatus must be used to release each module from the pipeline. This has been accomplished by any one of a number of latching mechanisms which can be mechanically, hydraulically, electrically or pyrotechnically actuated to release each module. Remote control has also been used with apparatus for severing a strap that binds a buoyant module to the pipeline. Frequently, however, such mechanisms are susceptible to unforeseen openings which can cause extensive damage to the pipeline. For example, if one or more modules were accidently released, the weight of the pipeline between the remaining modules could cause the pipeline to buckle. Such mechanisms are also susceptible to unforeseen jamming when the buoyant module is to be released. When jamming occurs at this depth, the buoyant module can only be released by using extremely costly techniques such as atmospheric diving systems or deep saturation diving.

SUMMARY OF THE INVENTION

The present invention relates to a method and apparatus for releasing a buoyant module from a submerged pipeline. The apparatus comprises a sled assembly adapted to straddle the pipeline and having a wedge mounted on one end, and one or more strapping assemblies to connect the buoyant module to the pipeline. The strapping assemblies comprise one or more links designed to break and release the module when the module is pried away from the pipeline by the wedge of the sled assembly. Since the link of the strapping assembly must be broken to release the module, it is sufficiently strong to obviate a release caused by unforeseeable external forces.

The method comprises the steps of lowering the sled assembly from a floating vessel to straddle the pipeline, actuating the sled assembly to grip the pipeline, and pulling the sled assembly along the pipeline to apply sufficient force against the module to pry it away from the pipeline so that the links of the strapping assemblies break and release the module. Simply pulling the sled assembly along the pipeline obviates the jamming problem frequently associated with remotely controlled mechanisms.

DETAILED DESCRIPTION OF THE INVENTION

Figure 1:
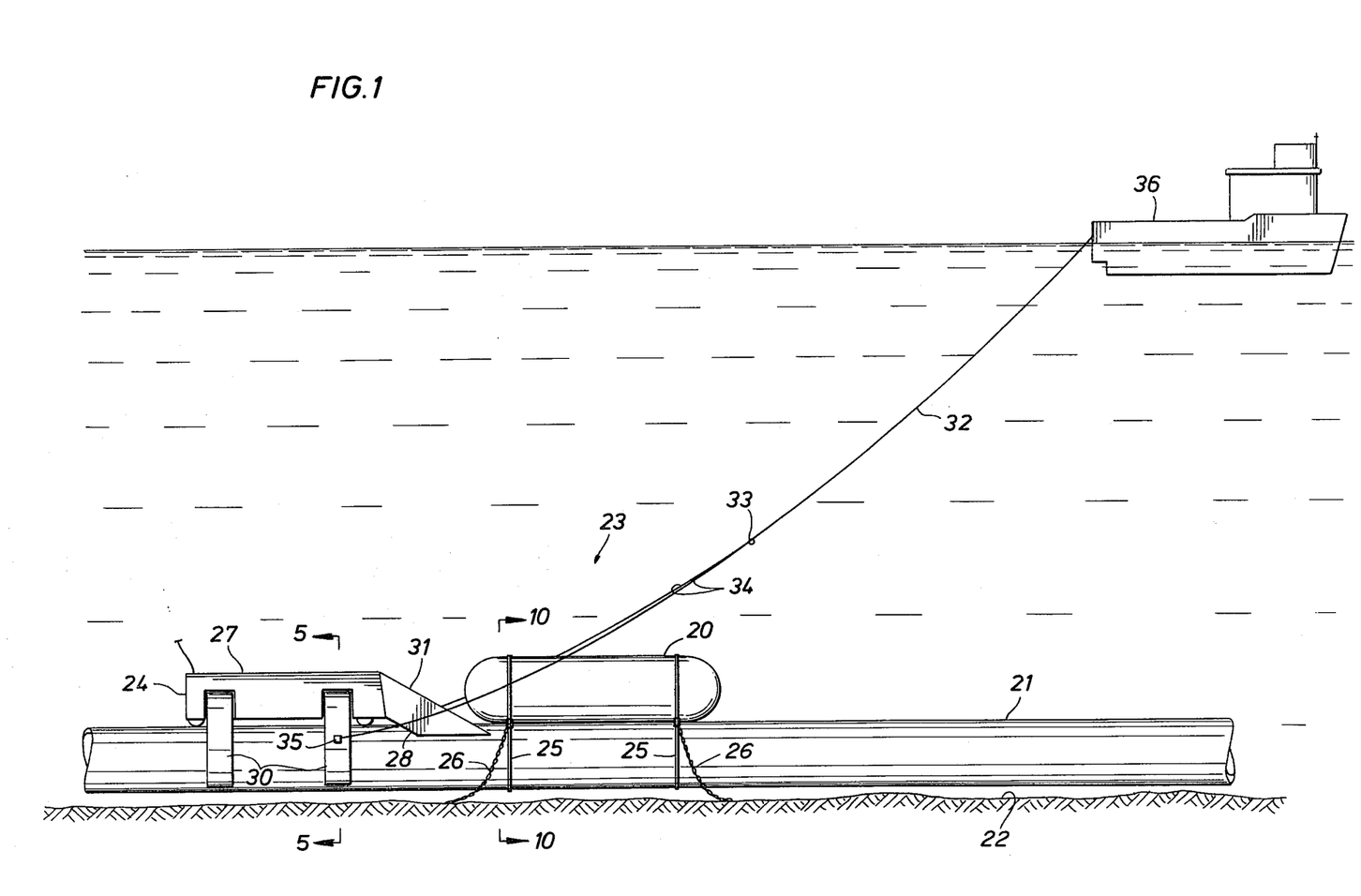
FIG. 1 is a partially schematic, side view of the apparatus comprising a sled assembly and strapping assemblies associated with a buoyant module on a pipeline in accordance with the invention.

Referring in more detail to FIG. 1, apparatus for releasing a buoyant module 20 which is releasably attached to a undersea pipeline 21 on the seafloor 22 is indicated generally at 23 and comprises a sled assembly 24 slideably mounted on the pipeline 21 and two strapping assemblies indicated generally at 25 for releasably attaching a module 20 to the pipeline 21. Other buoyancy modules (not shown) are spaced along the pipeline 21 to make the pipeline 21 neutrally buoyant, so that frictional stresses between the pipeline 21 and the sea floor 22 are reduced. As a practical matter, the positive buoyancy of the module 20 cannot be precisely matched to the weight of the pipeline 21 to achieve neutrality. Therefore, the module 20 is constructed so that its positive buoyancy is greater than the weight of the pipeline 21 and chains 26 are connected to the strapping assemblies 25 to compensate for the difference. The chains 26 have a specific weight per link and are connected to the strapping assemblies 25 so that the unattached ends of the chains 26 rest on the sea floor 22. If the module 20, the pipeline 21, and the chains 26 become positively buoyant and begin to rise, weight will be added to neutralize the buoyancy as each individual links of the chains 26 are elevated off the sea floor 22. Similarly, if the module 20, the pipeline 21, and the chains 26 become negatively buoyant and begin to sink, weight will be eliminated to offset that buoyancy when the individual links of the chains 26 are lowered to the sea floor 22. The sled assembly 24 comprises a body 27 having forward and aft ends, a wedge 28 mounted on the forward end of the body 27, and at least two pairs of coupling arms 30 pivotly connected to the forward and aft ends of the body 27 of the sled 24 to slideably engage the pipeline 21 when actuated. The wedge 28 has an inclined surface 31 extending downwardly and outwardly from the top of the sled body 27. A towing line 32 is attached by a link 33 to a towing yoke 34, each branch of which is connected to towing arms 35 attached to the corresponding forward coupling arms 30.

Figure 2:
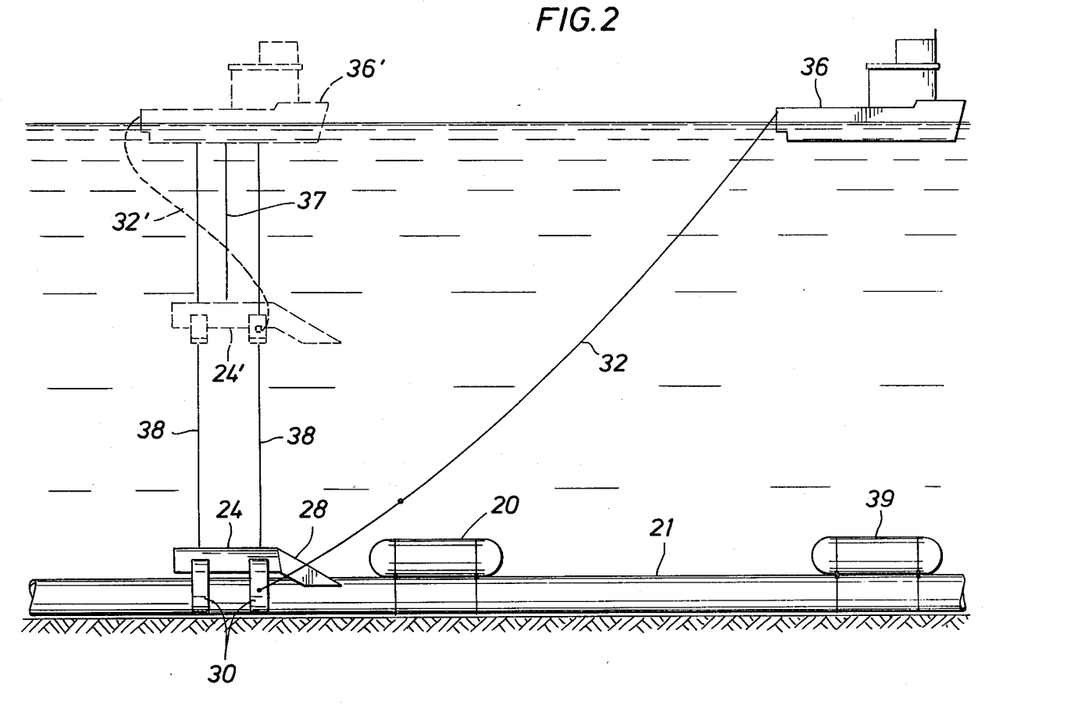
FIG. 2 is a partially schematic view of the apparatus of FIG. 1 in operation.
Figure 3:
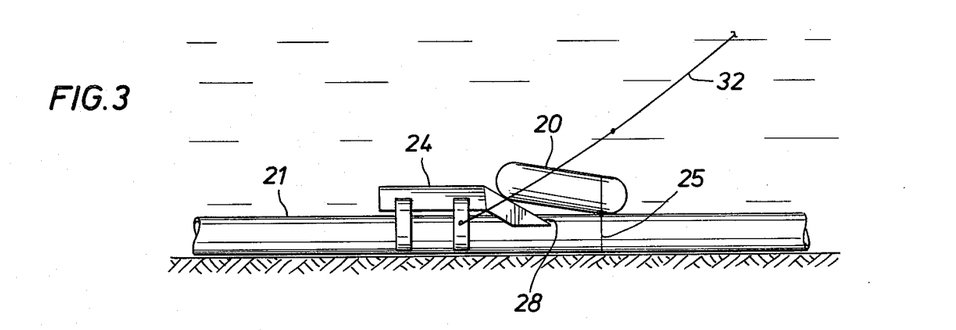
FIG. 3 is a partially schematic view of the apparatus of FIG. 2 showing the buoyant module being pried away from the pipeline in accordance with the invention.
Figure 4:
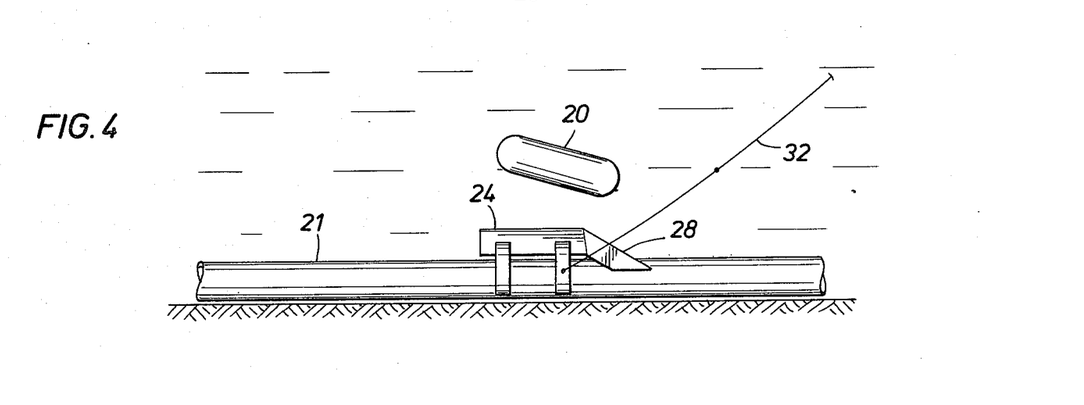
FIG. 4 is a partially schematic view of the apparatus of FIG. 2 showing the buoyant module being released from the pipeline in accordance with the invention.

With respect to the operation of the invention as shown in FIG. 2 in which the initial stage is illustrated by dashed lines and primed numerals, the towing line 32' is first attached to a vessel 36' from which the sled 24' can be lowered to the pipeline 21. The initially nonbuoyant sled 24 can be lowered by any suitable technique, such as, for example, guideline connections, remote guidance, or independent propulsion. The guideline technique comprises the steps of lowering the sled 24 through an opening (not shown) in or over the side of the vessel 36' by means of a hoist cable 37 and guiding the sled 24 from the vessel 36' down to the pipeline 21 by a pair of guide cables 38 connected therebetween. Alternatively, the sled 24' could be buoyant and hauled down to the pipeline by means of a winch line from the vessel 36' attached to a sheave or pulley attached to the frame supporting the guidelines 38 at the pipeline. When the sled 24' is being lowered to the pipeline 21, the coupling arms 30 are held in an open position. Television cameras (not shown) or other suitable means mounted on the sled 24' can be used to align it with the pipeline 21 during the final approach. Once the sled 24 is positioned on the pipeline 21, the hoist cable 37 and the guide cables 38 are retrieved by the vessel 36' and the coupling arms 30 are actuated to a closed position to grasp the pipeline 21. The sled 24 is then pulled by the vessel 36 along the pipeline 21 so that the wedge 28 applies a force against the module 20 to pry it away from the pipeline 21 as shown in FIG. 3. The prying contact of the wedge 28 breaks the first strapping assembly 25 and releases the front end of the module 20. Referring to FIG. 4, the continued motion of the sled 24 causes the wedge 28 to break the second strapping assembly 25 to release the module 20 which floats to the surface. After the first module 20 has been released, the sled 24 proceeds along the pipeline 21 to the next module 39 shown in FIG. 2.

Figure 5:
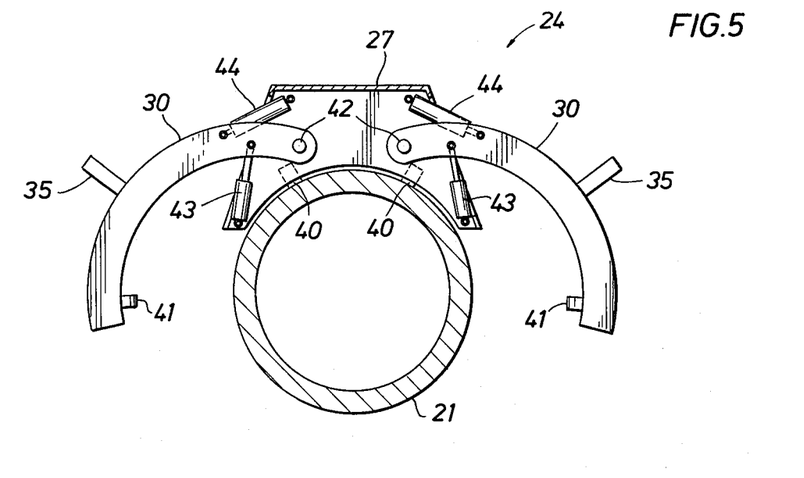
FIG. 5 is a partially schematic, vertical cross-section of the sled assembly of FIG. 1 in the open position straddling the pipeline taken along the line 5—5.

Referring now in more detail to the construction of the invention, the sled 24 in FIG. 5 is supported on the pipeline 21 by at least two pairs of wheels: one pair of wheels 40 mounted at the forward end of the body 27 of the sled 24 between the coupling arms 30 and the wedge 28 and the other pair (not shown) mounted at the aft end of the body 27 adjacent the other pair of the coupling arms 30 (not shown). The wheels 40 are mounted within the body 27 of the sled 24 and project through the underside surface of the body 27 to support the sled 24 above the pipeline 21 without direct contact so that the sled 24 moves freely along the pipeline 21. Wheels 41 are also mounted on the free end of each coupling arm 30 to facilitate movement of the sled 24 along the pipeline 21. The wheels 40 and 41 can be fabricated from a material such as, for example, steel, rubber, neoprene, or other suitable material, which is substantially nondeformable so that the distance between the body 27 of the sled 24 and the pipeline 21 is maintained when the wedge 28 applies a force against the buoyant module 20 to pry it away from the pipeline 21. The coupling arms 30 mounted on the forward and aft ends of the body 27 of the sled 24 pivot on pins 42 attached within the body 27 of the sled 24 and are held in an open position by a biasing mechanism such as, for example, telescopic springs 43 pivotally connected to the body 27 below the pivot points 42.

Figure 6:
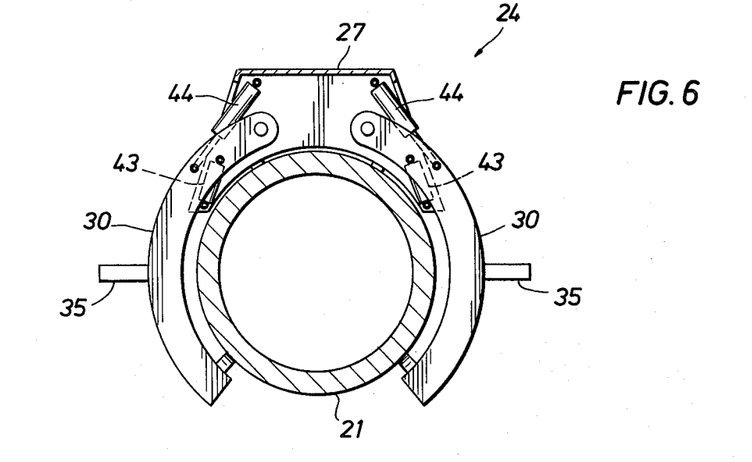
FIG. 6 is a vertical cross-section of the sled assembly of FIGURE in the closed position 5 engaging the pipeline.

Hydraulic or pneumatic cylinders 44 are pivotally connected between the coupling arms 30 and the body 27 of the sled 24 above the pivot points 42 to move the coupling arms 30 against the force being applied by the springs 43. It is to be understood that any type of biasing mechanism could be used such as, for example, other compression devices connected between the coupling arm 30 and inside the body 27 of the sled 24 above the pivot points 42, or helical devices connected between the coupling arm 30 and the pivot point 42. When the vessel 36 (not shown) applies hydraulic or pneumatic pressure to the cylinders 44, they actuate the coupling arms 30 to a closed position as shown in FIG. 6. Accordingly, the sled 24 can be removed from the pipeline 11 in the event of an inadvertent release of pressure caused by an accident or failure of the system because the springs 43 (FIG. 5) will move the coupling arms 30 back to the open position. The preferred embodiment of the sled body 27 employs pneumatic cylinders 44 and includes a self-contained buoyancy tank 90. After the coupling arms 30 are closed, a portion of the pneumatic pressure is diverted from the cylinders 44 to the buoyancy tank to evacuate enough sea water therefrom to make the sled 24 positively buoyant so that it rights itself on top of the pipeline 21.

Figure 7:
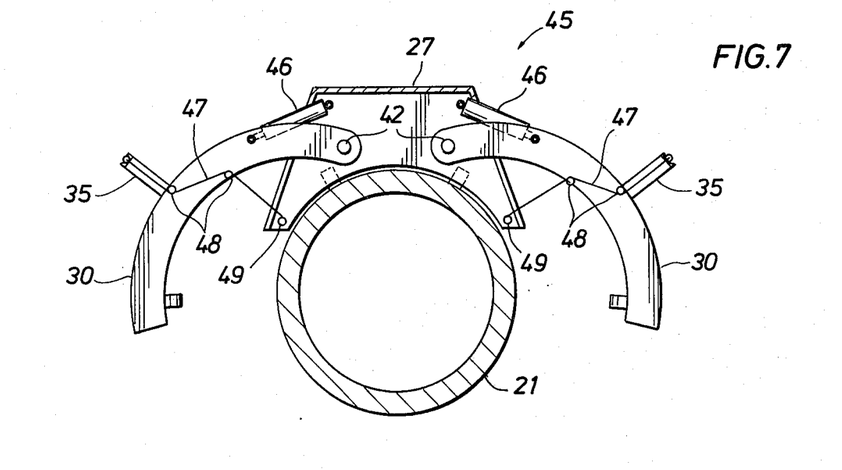
FIG. 7 is a partially schematic, vertical cross-section of another embodiment of the sled assembly of FIG. 1 in the open position taken along the line 5—5.
Figure 8:
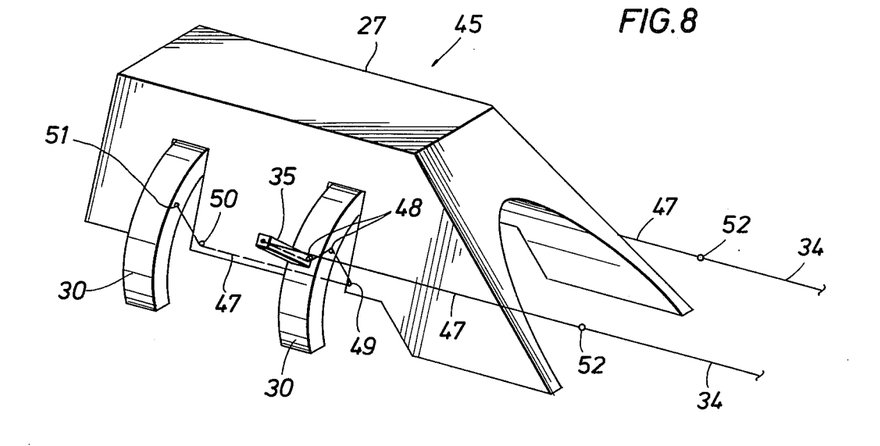
FIG. 8 is a partially schematic perspective view of the sled assembly of FIG. 7.

Another embodiment of a sled assembly in accordance with the invention is indicated generally at 45 in FIG. 7 and is similar to the sled assembly 24 of FIG. 5 to the extent that the same numerals are used. The actuating system for the sled assembly 45 as shown in FIG. 7 comprises a pair of tension springs 46 pivotally connected between the coupling arms 30 and inside the body 27 of the sled 45 above the pivot points 42 and cables 47 strung through the towing arms 35 and the forward coupling arms 30 into the body 27 of the sled 45. The tension springs 46 hold the coupling arms 30 in an open position as the sled 45 descends to the pipeline 21. The cables 47 are guided into and out from the coupling arms 30 by a pair of internally mounted sheaves 48 adjacent the entry and exit orifices in the coupling arms 30. The cables 47 are then guided into the body 27 of the sled 45 by internally mounted forward sheaves 49. Referring in more detail to FIG. 8 which shows only one side of the sled 45, the cables 47 are guided over the forward sheaves 49 along the length of the sled body 27 to internally mounted aft sheaves 50 adjacent the aft pair of coupling arms 30. The cables 47 are guided out of the sled body 27 by the aft sheaves 50 and are achored to the coupling arms at points 51. The unattached ends of the cables 47 extending out from the towing arms 35 are connected to the towing yoke 34 by links 52. When the vessel 36 begins to pull the sled 45, suitable braking means (not shown) cause it to remain stationary. As a result, the anchored cables 47 are tensioned and begin drawing in both the forward and aft coupling arms 30 on the internally mounted sheaves, 49 and 50 respectively. As the coupling arms 30 close around the pipeline 21 against the force of the tension springs 46 (shown in FIG. 7), the slack in the cables 47 is being pulled through the towing arms 35. When the coupling arms 30 are closed around the pipeline 21, they are locked in that position and release the braking means. Pneumatic pressure is then applied to the self-contained buoyancy tank (not shown) to evacuate enough sea water therefrom to make the sled 24 positively buoyant so that it rights itself on top of the pipeline 21.

Figure 9:
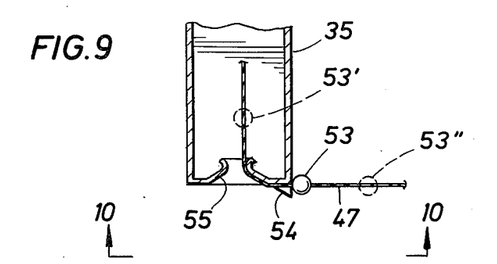
FIG. 9 is an enlarged break-away plan view of a towing arm of the sled assembly of FIG. 8.
Figure 10:
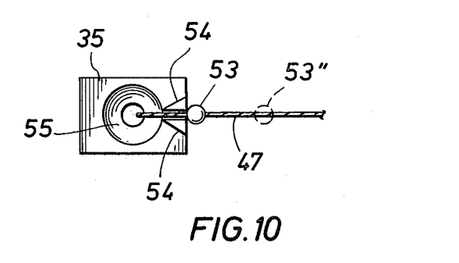
FIG. 10 is an end view of the towing arm of FIG. 9.

Referring in more detail to FIGS. 9 and 10, beads 53 are attached to the cables 47 at a predetermined position thereon so that the beads 53 are being pulled out of the towing arms 35 from some internal position 53' to some external position 53'' as the slack in the cables 47 is being pulled through the towing arms 35 to the closed position. Locking occurs when the prepositioned bead 53 lodges in a notch formed between a pair of nibs 54 on the unattached end of the towing arm 35. The unattached end of the towing arm 35 has a substantially concave mouth 55 which opens to an orifice sufficiently large to pass the bead 53. The nibs 54, which are mounted adjacent the forward edge of the mouth 54, form an inclined surface therewith so that the bead 53 slides over the notch between the nibs 54 when the slack in the cables 47 is being taken up. Once the bead 53 slides over the notch between the nibs 54, the cable 47 drops into the notch which is sufficiently narrow to prevent the bead 53 from being pulled back through the notch. As a result, the bead 53 on each cable 47 locks it in the tensioned state to keep the coupling arms 30 in the closed position. In order to unlock the cables 47, the vessel 36 pulls the cables 47 vertically upwardly to release the beads 53 from the corresponding notch.

Figures 11, 13:
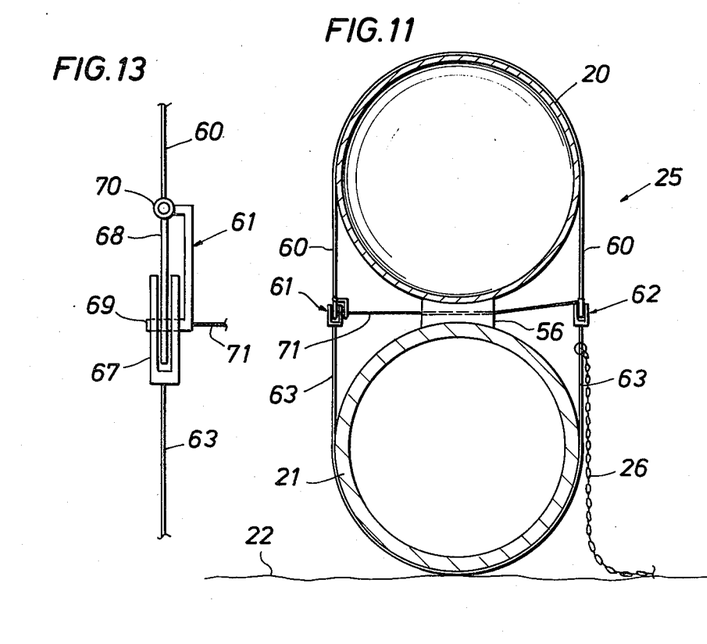
FIG. 11 is an end view of the strapping assembly of FIG. 1 taken along the line 10—10.
FIG. 13 is a partially schematic, enlarged break-away view of a hook link of the strapping assembly of FIG. 11.
Figure 12:
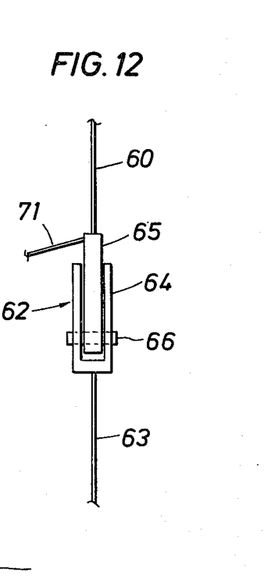
FIG. 12 is a partially schematic, enlarged break-away view of a clevis link of the strapping assembly of FIG. 11.

Although the apparatus 23 in FIG. 1 discloses the preferred embodiment which incorporates two strapping assemblies 25, the invention can also be accomplished by an embodiment incorporating a singular strapping assembly. For convenience, only one strapping assembly 25 as shown in FIG. 11 will be described. Each strapping assembly 25 holds the module 20 in a saddle 56 which is positioned on the pipeline 21. The saddle 56 can be fabricated from wood, metal or various plastics. The strapping assembly 25 comprises a first strap 60 wrapped over the top of the module 20, a releasable hook link 61 having one end attached to one end of the strap 60, a clevis link 62 having one end attached to the other end of the strap 60, and a second strap 63 wrapped around the bottom of the pipeline 21 and connected between the other ends of the hook link 61 and the clevis link 62. The clevis link 62 (FIG. 12) comprises a yoke 64 attached to the second strap 63, a shearing bar 65 attached to the first strap 60 and releasably seated within the yoke 64, and a pin 66 running through holes in the arms of the yoke 64 and through a hole in the shearing bar 65. The hook link 61 (FIG. 13) comprises a yoke 67 attached to the other end of the second strap 63, a connecting bar 68 attached to the first strap 60 releasably seated and within the yoke 67, and a pin 69 slideably inserted in holes through the arms of the yoke 67 and a hole through the connecting bar 68 and hingeably connected to the juncture 70 between the first strap 60 and the connecting bar 68. The strapping assembly 25 (FIGS. 11, 12 and 13) also comprises a cable 71 connected between the pin 69 of the hook link 61 and the shearing bar 65 of the clevis link 62, and which passes through a hole through the saddle 56. Again referring to the invention in operation as shown in FIG. 2, the sled 24 is pulled by the vessel 36 along the pipeline 21 so that the wedge 28 applies force against the module 20 to pry it away from the pipeline 21. The prying force applied by the wedge 28 causes the shearing bar 65 (FIGS. 11, 12, and 13) of the clevis hook 62 to shear the pin 66 and release the front end of the module 20. Continued prying force as well as the rising of the front end of the module 20 tensions the first strap 60 and the cable 71 which extracts the pin 69 of the hook link 61 from the yoke 67 to release the connecting bar 68 and completely free the front end of the module 20 as shown in FIG. 3. Continued motion of the sled 24 causes the wedge 28 to break the second strapping assembly 25 to completely release the module 20 which floats to the surface as shown in FIG. 4. The cable 71, the straps 60 and 63 (FIG. 11) and the chains 26 connected thereto drop to the sea floor 22.

The amount of force required to shear the pin 66 (FIG. 12) of the clevis hook 62 is dependent upon the sum of the upward prying force ($F_p$) and the net buoyancy ($F_b$) of the module 20. For example, the assumed submerged weight of a pipeline thirty-six inches in diameter and submerged under 500 feet of water is approximately eighty pounds per foot. At that depth, a cylindrical buoyancy module having hemispherical end-caps and an overall wall thickness of 0.5 inch provides a net buoyancy of approximately 175 pounds per foot. Therefore, the cylindrical buoyancy modules 10 can be constructed to be 18 feet in length yielding an approximate individual net buoyancy ($F_b$) of 3150 pounds per module (including chains and hardware) and can then be positioned at approximate intervals of 40 feet on the pipeline 21 (FIG. 2) to make it neutrally buoyant. It is to be understood, that the buoyancy module 20 can be fabricated from other materials such as, for example, syntactic foam, and can be formed into other shapes such as, for example, blocks or spheres. Assuming that the net buoyancy is divided approximately equally between each end of the first strap 60 (FIGS. 11 and 12), i.e., a frictionless contact between the strap 60 and the module 20, the pin 66 of the clevis hook 62 is designed to shear when subjected to a shearing force greater than one-half the net buoyancy of the module 20. The amount of force required must be sufficiently large to obviate a release caused by unforeseeable external forces which are dependent upon the particular location. Thus, for example, if the pin 66 is fabricated from mild steel and designed to shear when subjected to a force as large as that exerted by the total net buoyancy ($F_b$), the size of the pin 66 must be approximately one-half inch in diameter. Consequently, the prying force ($F_p$) exerted by the wedge 28 on the module 20 must be greater than the net buoyancy ($F_b$) of the module 10 to shear the pin 66. To generate the required upward prying force ($F_p$) of, for example, 5,000 pounds (3,850 pounds greater than the net buoyancy), a forward force of approximately 10,000 to 15,000 pounds must be provided by the wedge 28 wherein the inclined surface 31 has a slope between approximately 30 and 45 degrees and a coefficient of friction of approximately 0.3.

Figure 14:
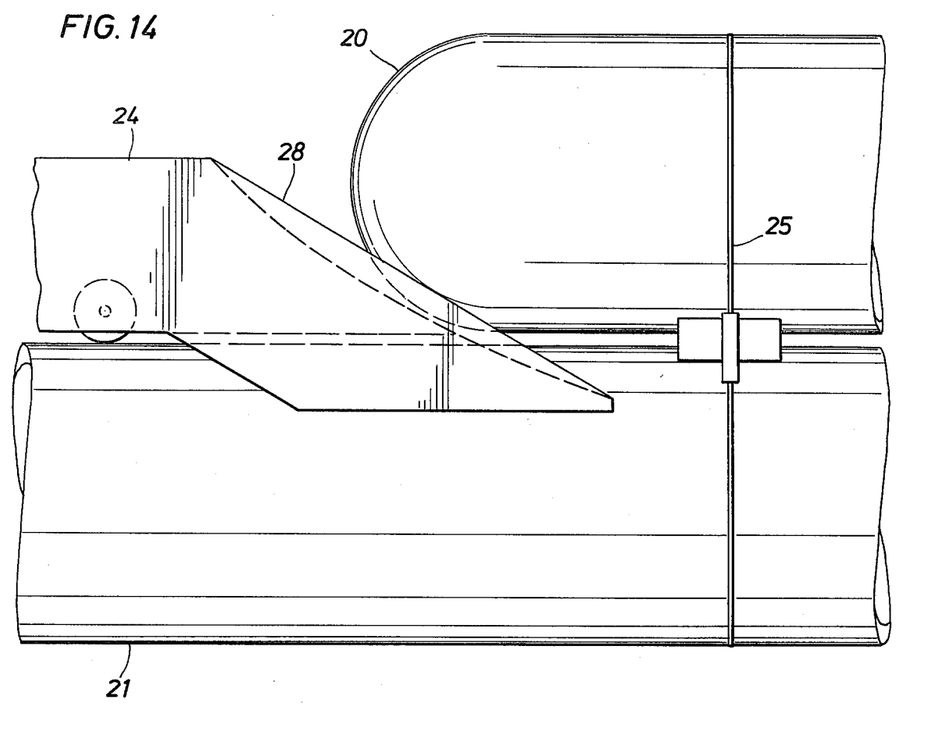
FIG. 14 is a partially schematic, side view of a wedge mounted on the sled assembly of FIG. 1 as it engages the buoyant module.
Figure 15:
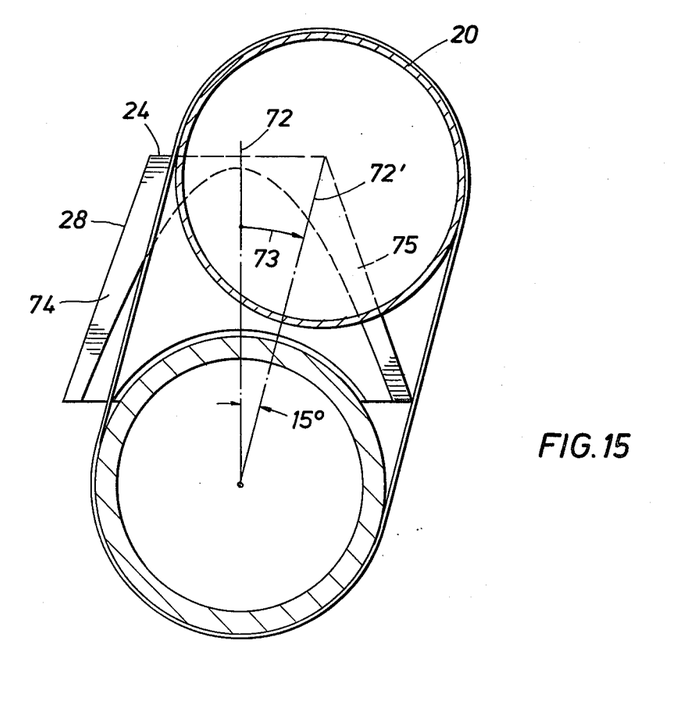
FIG. 15 is a partially schematic, end view of the wedge as it engages the buoyant module in an unaligned position.

To ensure that the proper amount of prying force ($F_p$) is exerted on the module 20, the inclined surface 31 of the wedge 28 must be properly contoured. As shown in FIG. 14, the inside portion of the inclined surface 31 is concave to address the module 20 at the prescribed angle of inclination upon impact and then to pry the module 20 further off the pipeline 21 by the increasing slope of the inclined surface 31 as the wedge continues to move underneath the module 20. Another problem illustrated in FIG. 15 arises when the module 20, or the body 27 of the sled 24 when not positively buoyant, is not precisely positioned on top of the pipeline 21. If the module 20 were aligned, the inclined surface 31 would be concave along a line 72 between the centers of the module 20 and the pipeline 21. However, misalignment can be as much as 15 degrees from vertical. To compensate for occasional misalignment, the inclined surface 31 has the same concave dimension on the line 72 for all misalignments up to ±15 degrees. For example, for a misalignment of 15 degrees, the inclined surface 31 is concave along the line 72' between the centers of module 20 and the pipeline 21. Therefore, the inclined surface 31 is relatively flat along the generally horizontal sector 73 so that the wedge 28 addresses the module 20 at the prescribed angle upon impact. The side edges 74 and 75 of the wedge 28 form lips extending outwardly from the inclined surface 31 to contain the module 20. Additionally, the lower surface of the wedge 28 conforms to the upper surface of the pipeline 21 so that the inclined surface extends forward beyond the lower surface to present a larger surface area to the module 20 as shown in FIG. 15 and to scoop underneath the module 10 as shown in FIG. 14. While it is not essential to the practice of this invention that the wedge 28 be contoured as described hereinabove, a contoured wedge greatly facilitates application of the prescribed prying force ($F_p$) required to shear the pin 66 (FIG. 12) of the clevis hook 62.

It will be apparent that various changes may be made in details of construction from those shown in the attached drawings and discussed in conjunction therewith without departing from the spirit and scope of this invention as defined in the appended claims. For example, the invention can also be accomplished by an embodiment of the strapping assembly 25 (FIG. 11) which incorporates a second shearable clevis link to replace the hook link 61. It is, therefore, to be understood that this invention is not limited to the specific details shown and described.

What I claim is:

1. Apparatus for releasably attaching a buoyant module to a submerged pipeline. comprising:
    a first strap wrapped over the top of the module;
    a second strap wrapped around the underside of the pipeline;
    a first link connected between one pair of opposing ends of said first and second straps, said first link being breakable upon application thereto of a preselected tension greater than that exerted thereon by the positive buoyant force of the module;
    a second link releasably connected between the other pair of opposing ends of said first and second straps; and
    means for releasing said second link from between said first and second straps in response to the first link being broken.

2. Apparatus as recited in claim 1, wherein said releasing means includes a cable connected between said first and second links, and wherein said first link is a clevis link including a yoke attached to said second strap, a bar having one end attached to said first strap and said cable and the other end releasably seated within said yoke, and a pin extending through a hole in each arm of said yoke and a hole in said bar, said pin being shearable upon application of the design tension to said bar.

3. Apparatus as recited in claim 2, wherein said second link is a hook link including a yoke attached to said second strap, a bar having one end attached to said first strap and the other end releasably seated within said yoke, a pin having one end slideably extending through a hole in each arm of said yoke and a hole in said bar and the other end connected to said cable and rotateably connected to the juncture between said first strap and said bar.

4. Apparatus for releasably attaching a buoyant module to a submerged pipeline and for releasing the module therefrom, comprising:
    at least one strapping assembly including a first strap wrapped over the top of the module, a second strap wrapped around the underside of the pipeline, a first link connected between one pair of opposing ends of said first and second straps, said link being breakable upon application thereto of a preselected tension greater than that exerted thereon by the positive buoyant force of the module, a second link releasably connected between the other pair of opposing ends of said first and second straps, and means for releasing said second link from between said first and second straps in response to breaking of said first link;
    a sled slideably mounted on the upper surface of the pipeline, said sled being adapted to be deployed to said pipeline subsequent to said pipeline being submerged;
    means for engaging said sled to a source of propulsion; and,
    a wedge attached to the leading end of said sled having an inclined surface sloping downwardly from the top of said sled to the pipeline and pryably engageable with the module;
    whereby said wedge, when propelled by a sufficient force against the module, prys the module from the pipeline by exerting an upward force thereon that exceeds the difference between the preselected tension and the positive buoyant force of the module to break said first link.

5. Apparatus as recited in claim 4, wherein said releasing means includes a cable connected between said first and second links, and wherein said first link is a clevis link including a yoke attached to said second strap, a bar having one end attached to said first strap and said cable and the other end releasably seated within said yoke, and a pin extending through a hole in each arm of said yoke and a hole in said bar, said pin being shearable upon application of the preselected tension to said bar.

6. Apparatus as recited in claim 5, wherein said second link is a hook link including a yoke attached to said second strap, a bar having one end attached to said first strap and the other end releasably seated within said yoke, a pin having one end slideably extending through a hole in each arm of said yoke and a hole in said bar and the other end connected to said cable and rotateably connected to the juncture between said first strap and said bar.

7. Apparatus as recited in claim 4, wherein the pryably engageable inclined surface of said wedge slopes downwardly at an angle from about 30 degrees to about 45 degrees and is curved inwardly along a radius from the center of the pipeline through the center of the inclined surface and along all other such radii rotated about 15 degrees in both directions from the center of the inclined surface.

8. Apparatus as recited in claim 4, wherein the underside surface of said wedge conforms in shape to and wraps partially around the upper surface of the pipeline so that the inclined surface of said wedge continues to slope downwardly from the top of the pipeline underneath the module.

9. A method for releasing a buoyant module releasably attached to a submerged pipeline by a connection, said connection being adapted for release upon the application of a preselected separation force between the buoyant module and the pipeline, comprising the steps of:

positioning a sled having a wedged end on the submerged pipeline;
actuating coupling arms pivotally attached to the sled to a closed position in which the arms slideably grip the pipeline; and,
propelling the wedged end of the sled along the pipeline against the module with sufficient force to pry the module substantially upward to release the connection and free the module.

10. A method as recited in claim 9, comprising additional steps of lowering the sled by a cable from a vessel to the pipeline; guiding the sled from the vessel to the pipeline on cables connected therebetween; and, retrieving the guiding cables.

11. The method as set forth in claim 9, further comprising the steps of:

continuing to propel the wedged end of the sled along the pipeline after release of the module;
propelling the wedged end of the sled along the pipeline against a second module with sufficient force to pry the second module substantially upward to release the connection and free the module.

* * * * *